United States Patent
Tatami et al.

(10) Patent No.: US 10,988,384 B2
(45) Date of Patent: Apr. 27, 2021

(54) GRAPHITE-SHEET PROCESSED ARTICLE AND GRAPHITE SHEET PROCESSED ARTICLE MANUFACTURING METHOD

(71) Applicant: KANEKA CORPORATION, Osaka (JP)

(72) Inventors: Atsushi Tatami, Osaka (JP); Mutsuaki Murakami, Osaka (JP); Masamitsu Tachibana, Osaka (JP)

(73) Assignee: KANEKA CORPORATION, Osaka (JP)

( * ) Notice: Subject to any disclaimer, the term of this patent is extended or adjusted under 35 U.S.C. 154(b) by 46 days.

(21) Appl. No.: 16/307,419

(22) PCT Filed: Jun. 7, 2017

(86) PCT No.: PCT/JP2017/021073
§ 371 (c)(1),
(2) Date: Dec. 5, 2018

(87) PCT Pub. No.: WO2017/213167
PCT Pub. Date: Dec. 14, 2017

(65) Prior Publication Data
US 2019/0300373 A1    Oct. 3, 2019

(30) Foreign Application Priority Data

Jun. 7, 2016 (JP) .............................. JP2016-113819

(51) Int. Cl.
*C01B 32/205* (2017.01)
*C01B 32/21* (2017.01)
*C01B 32/20* (2017.01)

(52) U.S. Cl.
CPC ............ *C01B 32/205* (2017.08); *C01B 32/20* (2017.08); *C01B 32/21* (2017.08); *C01P 2002/60* (2013.01); *C01P 2004/24* (2013.01); *C01P 2006/10* (2013.01); *C01P 2006/32* (2013.01); *C01P 2006/40* (2013.01)

(58) Field of Classification Search
CPC .............................. C01B 32/20; C01B 32/205
See application file for complete search history.

(56) References Cited

U.S. PATENT DOCUMENTS

| | | | | |
|---|---|---|---|---|
| 6,324,195 | B1* | 11/2001 | Suzuki | B23K 26/0604 257/E27.125 |
| 9,807,878 | B2* | 10/2017 | Tatami | B32B 27/34 |
| 2004/0043220 | A1 | 3/2004 | Hirose et al. | |
| 2005/0196613 | A1 | 9/2005 | Hirose et al. | |
| 2007/0032589 | A1* | 2/2007 | Nishikawa | C08G 73/1053 524/495 |
| 2009/0246493 | A1 | 10/2009 | Hirose et al. | |
| 2016/0249453 | A1 | 8/2016 | Tatami et al. | |
| 2018/0203139 | A1* | 7/2018 | Tatami | H05H 7/00 |
| 2019/0039908 | A1* | 2/2019 | Tachibana | C01B 32/184 |

FOREIGN PATENT DOCUMENTS

| | | |
|---|---|---|
| EP | 1661856 A1 | 5/2006 |
| JP | 4490506 B1 | 6/2010 |
| JP | 2011093745 A | 5/2011 |
| JP | 5210842 B2 | 6/2013 |
| JP | 2014031287 A | 2/2014 |
| WO | 2015045641 A1 | 4/2015 |

OTHER PUBLICATIONS

Takeichi, Tsutomu, et al. "Carbonization and graphitization of polyimide films: Effect of size of leaving group at imidization." Journal of applied polymer science 68.10 (May 18, 1998): 1613-1620. (Year: 1998).*
International Search Report issued in International Application No. PCT/JP2017/021073, dated Aug. 1, 2017 (2 pages).
International Preliminary Report on Patentability and Written Opinion issued in corresponding International Application No. PCT/JP2017/021073, dated Dec. 20, 2018 (8 pages).
Extended European Search Report issued in corresponding European Application No. 17810341.2, dated Jan. 2, 2020 (7 pages).

* cited by examiner

*Primary Examiner* — Benjamin A Schiffman
(74) *Attorney, Agent, or Firm* — Osha Bergman Watanabe & Burton LLP

(57) ABSTRACT

In order to attain an object to achieve a graphite sheet processed product which is made of high quality graphite and which has a smooth cut surface even after being subjected to a cut process, a graphite sheet processed product of the present invention has a thickness of not less than 10 nm and not more than 20 μm, has a cross-sectional area 90% or more of which is occupied by graphite layers each extending continuously or discontinuously in a horizontal direction, the cross-sectional area being observed with use of a scanning electron microscope (SEM), includes therein graphite crystal having an average crystal grain size of not less than 0.35 μm and not more than 25 μm, and has, on a cut surface thereof, a burr having a size that is not more than 15% of a line width thereof, the line width being less than 400 μm.

5 Claims, No Drawings

GRAPHITE-SHEET PROCESSED ARTICLE AND GRAPHITE SHEET PROCESSED ARTICLE MANUFACTURING METHOD

TECHNICAL FIELD

The present invention relates to a processed product of a graphite sheet (hereinafter referred to as a "graphite sheet processed product") and a method for producing a graphite sheet processed product.

BACKGROUND ART

A graphite sheet is expected to be applied to, for example, an electrode, a wire, a sensor, a vibration plate, a reflecting plate, and a heat radiating material because the graphite sheet has a high electric conductivity, has an excellent heat resistance and an excellent heat conductivity, and has an extremely high Young's modulus.

The shape of such a graphite sheet is required to be easily processable with use of, for example, a cutter, a trimming cutter, a laser, or a water cutter in accordance with a purpose of use of the graphite sheet. Note, however, that, in a case where a graphite sheet is thin and is to be cut with a cutter, a burr is more likely to occur in a cut surface of the graphite sheet. Thus, it is extremely difficult to precisely process a graphite sheet. The occurrence of a burr causes a change in, for example, resistance. This makes it difficult to use a graphite sheet as a wiring material, and, unfortunately, prevents a sensor or the like in which a graphite sheet is used from having a stable characteristic. In a case where a burr occurs in a part of a graphite sheet, breakage of the graphite sheet is more likely to start from the burr. This causes a trouble in the graphite sheet during processing or use of the graphite sheet. During, for example, a process for processing the graphite sheet or a process for manufacturing a device, graphite powder is more likely to fall off an edge surface part of the burr. The graphite powder may lead to production of a defective product. Against a background of this, a graphite sheet has been eagerly desired which is made of such high quality graphite as to be used as a wire, a sensor, or any other electronic material and which can be easily processed with use of, for example, a cutter, a trimming cutter, a laser, or a water cutter.

A conventional method for processing a graphite sheet is exemplified by a method of attaching a release film to a graphite sheet and punching out a piece from the graphite sheet to which the release film is attached (for example, Patent Literature 1). Note, however, that according to the technique disclosed in Patent Literature 1, the graphite sheet which is thinner makes it difficult to peel the release film off the graphite sheet. Thus, the technique disclosed in Patent Literature 1 cannot be practically used.

Another conventional technique is exemplified by a method of processing a graphite sheet by plating the graphite sheet with a metal (for example, Patent Literature 2). Note, however, that according to the technique disclosed in Patent Literature 2, in a case where a metal is not desired to be used, a step of removing the metal later is necessary.

Furthermore, still another conventional technique is exemplified by a method of processing expanded graphite (for example, Patent Literature 3). Note, however, that expanded graphite which is made thinner unfortunately has a lower strength. Thus, the technique disclosed in Patent Literature 3 has a problem in producing a wire, a sensor, or a vibration plate by processing a graphite sheet which is extremely thin and has a high quality.

Moreover, Patent Literature 4 discloses (i) a sheet of graphite which sheet has a high carrier mobility characteristic and has a better withstanding electric current density characteristic than a copper wire and (ii) a graphite wiring material which is formed by partially removing the graphite from the sheet of the graphite. Note, however, that especially a wiring board in which micro wires made of graphite are provided has the following problem. Specifically, in a case where a wiring edge surface has a defective part (irregularities) and a great electric current is applied to the defective part, a heavy load is applied to the defective part, so that the wires may be broken.

CITATION LIST

Patent Literatures

[Patent Literature 1]
Japanese Patent Application Publication, Tokukai, No. 2014-31287
[Patent Literature 2]
Specification of Japanese Patent No. 4490506
[Patent Literature 3]
Specification of Japanese Patent No. 5210842
[Patent Literature 4]
Pamphlet of International Publication No. WO 2015/045641

SUMMARY OF INVENTION

Technical Problem

An aspect of the present invention has been made in view of the problems and has an object to provide (i) graphite sheet processed product which is made of such high quality graphite as to be used as a wire, a sensor, a vibration plate, a reflecting plate, or any other electronic material and which has a smooth cut surface even after being subjected to a cut process carried out with use of, for example, a cutter, a trimming cutter, a laser, or a water cutter and (ii) a method for producing a graphite sheet processed product.

Solution to Problem

In order to attain the object, a graphite sheet processed product in accordance with an aspect of the present invention includes: a graphite sheet, the graphite sheet processed product having a thickness of not less than 10 nm and not more than 20 µm, the graphite sheet processed product having, in at least a part thereof, a linear structure, the linear structure being a structure having a line width of less than 400 µm, the graphite sheet processed product having, on a cut surface thereof, a burr having a size that is not more than 15% of the line width, the graphite sheet having a cross-sectional area 90% or more of which is occupied by graphite layers each extending continuously or discontinuously in a horizontal direction, the cross-sectional area being observed with use of a scanning electron microscope (SEM), the graphite sheet including therein graphite crystal having an average crystal grain size of not less than 0.35 µm and not more than 25 µm, and the graphite sheet processed product having, on the cut surface of the graphite sheet, the burr having a size that is not more than 15% of the line width, the line width being less than 400 µm.

In order to attain the object, a method in accordance with another aspect of the present invention for producing a graphite sheet processed product is a method for producing a graphite sheet processed product recited above, including: obtaining a graphite sheet by heat-treating a polymer film at a temperature of not lower than 2400° C. under an inert gas atmosphere.

Advantageous Effects of Invention

According to these aspects of the present invention, it is possible to achieve a graphite sheet processed product which is made of such high quality graphite as to be used as a wire, a sensor, a vibration plate, a reflecting plate, or any other electronic material and which has a smooth cut surface even after being subjected to a cut process carried out with use of, for example, a cutter, a trimming cutter, a laser, or a water cutter.

DESCRIPTION OF EMBODIMENTS

As described earlier, a technique has been developed in which a graphite sheet that has a high carrier mobility characteristic and has a better withstanding electric current density characteristic than a copper wire is used as a wiring material. Note, however, that inventors of the present invention exclusively found that the following problem remains to be solved. Specifically, even in a case where a wiring material is made by carrying out a cut process with respect to a graphite sheet, a circuit wiring board, for example that includes (i) a hoard and (ii) micro wires which are provided on the board and have an extremely small width (a width of not less than 1 μm and not more than 400 μm) has a problem such that, in a case where a graphite cut surface has a defective part (irregularities), a heavy load is applied to the defective part depending on a magnitude of an electric current that is applied to the defective part, so that the wires may be broken. Such a problem with a graphite cut surface which problem occurs while a graphite sheet is being subjected to a cut process is a problem that has never been recognized in the technical field to which the present invention pertains, and can be said to be a new problem. Under the circumstances, the inventors of the present invention diligently made an effort to develop a graphite sheet processed product that is suitable for a circuit wiring board in which micro wires are provided.

As a result, by using a graphite sheet which has a specific characteristic and given dimensions, the inventors of the present invention succeeded in developing a graphite sheet processed product whose quality is so high as to be used as a wire, a sensor, a vibration plate, a reflecting plate, or any other electronic material (especially a material of which the micro wires are made) and which has a smooth cut surface even after being subjected to a cut process carried out with use of, for example, a cutter, a trimming cutter, a laser, or a water cutter. The inventors of the present invention accomplished the present invention by finding new knowledge that the problems described earlier can be solved by setting, at respective given numerical values, the thickness of a graphite sheet, an orientation of graphite layers inside the graphite sheet, an average crystal grain size of graphite crystal included in the graphite sheet, the size of a burr on a cut surface of the graphite sheet which cut surface intersects with a film surface of the graphite sheet, and the line width of the graphite sheet.

A graphite sheet processed product in accordance with an embodiment of the present invention is a processed product obtained by carrying out a cut process with respect to a graphite sheet with use of, for example, a cutter, a trimming cutter, a laser, or a water cutter. The graphite sheet processed product in accordance with an embodiment of the present invention is not limited to any particular graphite sheet processed product provided that the graphite sheet processed product meets the following requirements (1) through (5): (1) that the graphite sheet processed product has a thickness of not less than 10 nm and not more than 20 μm; (2) that the graphite sheet has a cross-sectional area 90% or more of which is occupied by graphite layers each extending continuously or discontinuously in a horizontal direction, the cross-sectional area being observed with use of a scanning electron microscope (SEM) (an orientation of the graphite layers inside the graphite sheet); (3) that the graphite sheet includes therein graphite crystal having an average crystal grain size of not less than 0.35 μm and not more than 25 μm; (4) that the graphite sheet processed product has, on a cut surface thereof, a burr having a size that is not more than 15% of a line width of the graphite sheet processed product; and that the graphite sheet processed product has a line width of less than 400 μm.

First of all, a graphite sheet in accordance with an embodiment of the present invention has a thickness of not less than 10 nm and not more than 20 μm (the above requirement (1)). The graphite sheet which has a thickness falling within the above range is suitably used for, for example, a sensor, a wire, a vibration plate, and a reflecting plate. The above thickness can be adjusted in accordance with a purpose of use of the graphite sheet processed product. The reason why a burr is less likely to occur in a region having the above thickness is considered to be because of the reasons below.

Specifically, in production of a graphite sheet by a polymer calcination method, a graphitization reaction is considered to proceed as below. Specifically, it is considered that a graphite structure is formed in an outermost surface layer of a carbonized polymer sheet first and then the graphite structure grows to an inside of the graphite sheet. Thus, the graphite sheet which is made thicker disturbs a graphite layer structure inside the carbonized sheet during the graphitization reaction, so that a cavity or a deficient part is more likely to be produced inside the graphite sheet. In contrast, the graphite sheet which is made thinner causes the graphitization reaction to proceed so that a state in which the graphite layer structure is well-regulated as seen in a surface of the graphite sheet is achieved also inside the graphite sheet. As a result, the graphite structure which is well-regulated throughout the graphite sheet is more likely to be made. In a case where the graphite sheet is cut and has a disturbed part due to the graphite layer structure which is not well-regulated, occurrence of a burr is more likely to start from the disturbed part. This may cause graphite powder to fall off a cut edge surface of the graphite sheet. For the above reasons, the graphite sheet has a thickness of not less than 10 nm and not more than 20 μm, preferably not less than 30 nm and not more than 15 μm, and more preferably not less than 50 nm and not more than 9.6 μm.

The orientation of the graphite layers inside the graphite sheet of the graphite sheet processed product in accordance with an embodiment of the present invention can be specified by observing a cross-sectional area of the graphite sheet with use of the scanning electron microscope (SEM). That is, according to the graphite sheet processed product in accordance with an embodiment of the present invention, the graphite sheet has a cross-sectional area 90% or more of which is occupied by the graphite layers each extending continuously or discontinuously in the horizontal direction, the cross-sectional area being observed with use of the scanning electron microscope (SEM) (the above requirement (2)). In a case where the cross-sectional area is observed with use of the scanning electron microscope (SEM) and the graphite layers have a part that is vertically or obliquely oriented, tearing of the graphite sheet processed product is more likely to start from that part. This is highly likely to produce a burr. From the above viewpoint, the graphite layers preferably have orientation such that the graphite sheet has a cross-sectional area 90% or more of which is occupied by the graphite layers each extending continuously or discontinuously in the horizontal direction, the cross-sectional area being observed with use of the scanning electron microscope (SEM). Furthermore, the graphite layers most preferably have orientation such that the graphite sheet has a cross-sectional area 95% or more of which is occupied by the graphite layers each extending continuously or discontinuously in the horizontal direction, the cross-sectional area being observed with use of the scanning electron microscope (SEM).

The graphite sheet of the graphite sheet processed product in accordance with an embodiment of the present invention includes therein graphite crystal having an average crystal grain size of not less than 0.35 µm and not more than 25 µm (the above requirement (3)). The graphite sheet to which force by which to cut the graphite sheet is externally applied is cut while causing a phenomenon of brittle fracture. This is because a tiny crack is caused in a grain boundary of graphite and the crack spreads over the grain boundary. Note here that a burr is more likely to occur in a case where the graphite sheet is cut and there is a great difference in crystal grain size of graphite crystal included in the graphite sheet. A too large crystal grain size causes a large burr to occur during the cutting of the graphite sheet. Meanwhile, a too small crystal grain size is less likely to cause a burr, but may cause fine powder of graphite to fall off the cut edge surface of the graphite sheet. Thus, the graphite sheet preferably includes therein graphite crystal having an average crystal grain size falling within a given range. From the above viewpoint, the graphite sheet includes therein graphite crystal having an average crystal grain size of preferably not less than 0.35 µm and not more than 25 µm, more preferably not less than 0.35 µm and not more than 20 µm, and most preferably not less than 0.4 µm and not more than 15 µm.

An average crystal grain size of graphite crystal included in a graphite sheet which is used in an embodiment of the present invention can be measured, based on a crystal analysis image obtained by, for example, a channeling contrast method or an Electron Back Scatter Diffraction Patterns (EBSD) method, by (i) a line analysis method, (ii) a calculation method based on software that is used in a measuring device, or (iii) a combination of (i) and (ii).

According to the graphite sheet processed product in accordance with an embodiment of the present invention, the graphite sheet processed product has, on a cut surface thereof which intersects with a graphite sheet surface, a burr having a size that is not more than 15% of the line width of the graphite sheet processed product (the above requirement (4)). The burr on the cut surface may cause a serious problem in a case where the graphite sheet processed product is applied to a precise component such as a wire. In a case where a great electric current is applied to a part in which a burr is formed, graphite of that part has a high resistance. Thus, the part is concentratedly subjected to Joule heating and sublimation proceeds, so that graphite is more likely to be broken. Meanwhile, in a case where the graphite sheet processed product is used for a sensor or the like, an error in measured value is more likely to be observed in the sensor or the like unless the graphite sheet processed product is cut so as to have a given size. Thus, a smaller burr is preferable. Note that an embodiment of the present invention defines a burr as uneven irregularities, having a size of not less than 1 mm, on an edge surface. From the above viewpoint, the graphite sheet processed product in accordance with an embodiment of the present invention has, on the cut surface thereof, the burr having a size that is not more than 15%, preferably not more than 12%, more preferably not more than 10%, and particularly preferably not more than 5% of the line width of the graphite sheet processed product. The size of the burr on the cut surface has an upper limit of less than 50 µm, more preferably not more than 40 µm, still more preferably not more than 30 µm, and particularly preferably not more than 10 µm. Meanwhile, the size of the burr on the cut surface has a lower limit of preferably not less than 1 µm and preferably not less than 5 µm.

The graphite sheet processed product in accordance with an embodiment of the present invention has, in at least a part thereof, a linear structure, the linear structure being a structure having a line width of less than 400 µm (the above requirement (5)). That is, the above problem with a circuit wiring board in which micro wires having a width of less than 400 µm are provided can be solved in a case where the above requirements (1) through (4) are satisfied by the graphite sheet processed product in accordance with an embodiment of the present invention. The line width of the graphite sheet processed product in accordance with an embodiment of the present invention has an upper limit of preferably less than 300 µm, more preferably less than 200 µm, still more preferably less than 100 µm, and particularly preferably less than 50 µm, though depending on, for example, a magnitude of an electric current to be applied to the circuit wiring board. Meanwhile, the line width of the graphite sheet processed product in accordance with an embodiment of the present invention has a lower limit of preferably not less than 10 µm and more preferably not less than 20 µm.

Note that the size of the burr on the cut surface of the graphite sheet processed product depends on a kind (physical property) of the graphite sheet and a method of carrying out a cut process with respect to the graphite sheet, and is independent of the line width of the graphite sheet processed product. Thus, even in a case where graphite sheet processed products are identical in line width, for example, a burr which is produced in one of the graphite sheet processed products due to cutting with a cutter and a burr which is produced in the other of the graphite sheet processed products due to cutting through laser processing may differ in size. Meanwhile, in a case where two graphite sheet processed products which have respective different line widths (e.g., a graphite sheet processed product which has a line width of 400 µm versus a graphite sheet processed product which has a line width of 2000 µm (2 mm)) are identical in graphite sheet and method of carrying out a cut process with respect to the graphite sheet, burrs on respective cut surfaces of the two graphite sheet processed products are less significantly different from each other and are substantially identical to each other.

According to the graphite sheet processed product in accordance with the present embodiment, in a case where the line width thereof is not less than 300 µm and less than 400 µm, the size of the burr is preferably not less than 10 µm and less than 50 µm. Furthermore, in a case where the line width is not less than 100 µm and less than 300 µm, the size of the burr is preferably not less than 5 µm and less than 30 µm. Moreover, in a case where the line width is not less than 10 μm and less than 100 μm, the size of the burr is preferably not less than 1 μm and less than 10 μm.

Note that the present embodiment also encompasses a graphite sheet processed product which includes the following features.

A graphite sheet processed product (1) having a thickness of not less than 10 nm and not more than 20 μm, the graphite sheet processed product having a cross-sectional area 90% or more of which is occupied by graphite layers each extending continuously or discontinuously in a horizontal direction, the cross-sectional area being observed with use of a scanning electron microscope (SEM), the graphite sheet processed product being made of a graphite sheet including therein graphite crystal having an average crystal grain size of not less than 0.35 μm and not more than 25 μm, the graphite sheet processed product having, on a cut surface thereof, a burr having a size of less than 50 μm, and the graphite sheet processed product having a line width of less than 400 μm. According to the graphite sheet processed product (1), the size of the burr on the cut surface has an upper limit of less than 50 μm, more preferably not more than 40 μm, still more preferably not more than 30 μm, and particularly preferably not more than 10 μm. Meanwhile, the size of the burr on the cut surface has a lower limit of not less than preferably 1 μm and preferably not less than 5 μm. Furthermore, according to the graphite sheet processed product (1), the line width has an upper limit of preferably less than 300 μm, more preferably less than 200 μm, still more preferably less than 100 μm, and particularly preferably less than 50 μm. Meanwhile, the line width has a lower limit of preferably not less than 10 μm and more preferably not less than 20 μm. Moreover, the burr on the cut surface has a size that is not more than 15%, preferably not more than 12%, more preferably not more than 10%, and particularly preferably not more than 5% of the line width.

A graphite sheet processed product (2) having a thickness of not less than 10 nm and not more than 20 μm, the graphite sheet processed product having a cross-sectional area 90% or more of which is occupied by graphite layers each extending continuously or discontinuously in a horizontal direction, the cross-sectional area being observed with use of a scanning electron microscope (SEM), the graphite sheet processed product being made of a graphite sheet including therein graphite crystal having an average crystal grain size of not less than 0.35 μm and not more than 25 μm, the graphite sheet processed product having, on a cut surface thereof, a burr having a size of not less than 10 μm and less than 50 μm in a case where the graphite sheet processed product has a line width of not less than 300 μm and less than 400 μm, the graphite sheet processed product having, on the cut surface thereof, the burr having a size of not less than 5 μm and less than 30 μm in a case where the graphite sheet processed product has a line width of not less than 100 μm and less than 300 μm, and the graphite sheet processed product having, on the cut surface thereof, the burr having a size of not less than 1 μm and less than 10 μm in a case where the graphite sheet processed product has a line width of not less than 10 μm and less than 100 μm.

A graphite sheet processed product having a thickness of not less than 10 nm and not more than 20 μm, the graphite sheet processed product having a cross-sectional area 90% or more of which is occupied by graphite layers each extending continuously or discontinuously in a horizontal direction, the cross-sectional area being observed with use of a scanning electron microscope (SEM), the graphite sheet processed product being made of a graphite sheet including therein graphite crystal having an average crystal grain size of not less than 0.35 μm and not more than 25 μm, the graphite sheet processed product having, on a cut surface thereof, a burr having a size which is more than 2.5% and not more than 16.7% of a line width of the graphite sheet processed product which line width is not less than 300 μm and less than 400 μm, the graphite sheet processed product having, on the cut surface thereof, the burr having a size which is more than 1.66% and not more than 30% of the line width of the graphite sheet processed product which line width is not less than 100 μm and less than 300 μm, and the graphite sheet processed product having, on the cut surface thereof, the burr having a size which is more than 1% of the line width of the graphite sheet processed product which line width is not less than 10 μm and less than 100 μm.

The graphite sheet which is used in an embodiment of the present invention preferably has a density of not less than 1.80 g/cm$^3$ and not more than 2.26 g/cm$^3$. In a case where the graphite sheet has a lower density due to a deficient part or a cavity which is produced inside the graphite sheet, occurrence of a burr is more likely to start from that deficient part or cavity during cutting of the graphite sheet. From the above viewpoint, graphite has a density of preferably not less than 1.80 g/cm$^3$, more preferably not less than 1.85 g/cm$^3$, and most preferably 1.99/cm$^3$.

The graphite sheet which is used in an embodiment of the present invention preferably has a thermal conductivity of not less than 700 W/mK. Recent achievement of a space-saving electronic device and a higher-performance electronic device requires a material that allows heat generated from an integrated circuit to be spread throughout a housing. Given this, the graphite sheet is required to have a thermal conductivity equal to or higher than a thermal conductivity (400 W/mK) of copper. From the above viewpoint, the graphite sheet processed product in accordance with an embodiment of the present invention preferably has a higher thermal conductivity, and has a thermal conductivity of preferably not less than 750 W/mK, more preferably not less than 800 W/mK, and most preferably not less than 1000 W/mK.

The graphite sheet which is used in an embodiment of the present invention preferably has an electric conductivity of not less than 5000 S/cm. The graphite sheet processed product which is used as a wiring material preferably has an electric conductivity that is as high as possible. From the above viewpoint, the graphite sheet processed product has an electric conductivity of preferably not less than 5000 S/cm, more preferably not less than 6000 S/cm, and most preferably not less than 7000 S/cm, and even the graphite sheet processed product which has an electric conductivity of not less than 8000 S/cm has no problem.

The graphite sheet processed product in accordance with an embodiment of the present invention is a highly thermally conductive film, has a high carbon purity, is chemically stable, and has an extremely high heat resistance. This raises no fear that outgassing may occur in the processed graphite sheet which is in a high vacuum and/or at a high temperature. Furthermore, the graphite sheet processed product in accordance with an embodiment of the present invention includes a feature of being obtainable in a form of a large-area film and also having a great mechanical strength.

Polymer Material

A polymer material which is preferably used to produce the graphite sheet in accordance with an embodiment of the present invention is an aromatic polymer. The aromatic polymer is preferably at least one polymer selected from polyamides, polyimides, polyquinoxaline, polyparaphenylene vinylene, polyoxadiazole, polybenzimidazole, polybenzoxazole, polybenzthiazole, polyquinazolinedione, polybenzoxazinone, polyquinazolone, benzimidazobenzophenanthroline ladder polymer, and derivatives of these polymers. A film that is made of such a polymer material can be produced by a publicly known production method. A particularly preferable polymer material can be exemplified by aromatic polyimides, polyparaphenylene vinylene, and polyparaphenylene oxadiazole. In particular, aromatic polyimides are preferable, and above all, an aromatic polyimide that is produced from an acid dianhydride (listed below, in particular, an aromatic acid dianhydride) and a diamine (listed below, in particular, an aromatic diamine) via a polyamide acid is particularly preferable as a polymer material to be used to produce the graphite sheet which is used in an embodiment of the present invention.

Examples of an acid dianhydride that can be used to synthesize the aromatic polyimide include pyromellitic anhydride, 2,3,6,7-naphthalene tetracarboxylic dianhydride, 3,3',4,4'-biphenyltetracarboxylic dianhydride, 1,2,5,6-naphthalene tetracarboxylic dianhydride, 2,2',3,3'-biphenyltetracarboxylic dianhydride, 3,3',4,4'-benzophenone tetracarboxylic dianhydride, 2,2-bis(3,4-dicarboxyphenyl)propane dianhydride, 3,4,9,10-perylene tetracarboxylic dianhydride, bis(3,4-dicarboxyphenyl)propane dianhydride, 1,1-bis(2,3-dicarboxyphenyl)ethane dianhydride, 1,1-bis(3,4-dicarboxyphenyl)ethane dianhydride, bis(2,3-dicarboxyphenyl)methane dianhydride, bis(3,4-dicarboxyphenyl)ethane dianhydride, oxydiphthalic dianhydride, bis(3,4-dicarboxyphenyl)sulfone dianhydride, p-phenylenebis (trimellitic, acid monoester acid anhydride), ethylenebis (trimellitic acid monoester acid anhydride), bisphenol A-bis (trimellitic acid monoester acid anhydride), and analogues of these acid dianhydrides. Those acid dianhydrides and the analogues thereof can be used alone or can be mixed at any ratio. From the viewpoint that an acid dianhydride which has a more rigid polymer structure allows a polyimide film to be higher in orientation and from the viewpoint of availability, pyromellitic anhydride and 3,3',4,4'-biphenyltetracarboxylic dianhydride are particularly preferable.

Examples of a diamine that can be used to synthesize the aromatic polyimide include 4,4'-diaminodiphenyl ether, p-phenylene, diamine, 4,4'-diaminodiphenyl propane, 4,4'-diaminodiphenyl methane, benzidine, 3,3'-dichlorobenzidine, 4,4'-diaminodiphenyl sulfide, 3,3'-diaminodiphenyl sulfone, 4,4'-diaminodiphenyl sulfone, 4,4'-diaminodiphenyl ether, 3,3'-diaminodiphenyl ether, 3,4'-diaminodiphenyl ether, 1,5-diaminonaphthalene, 4,4'-diaminodiphenyldiethyl silane, 4,4'-diaminodiphenyl silane, 4,4'-diaminodiphenyl ethyl phosphine oxide, 4,4'-diaminodiphenyl N-methylamine, 4,4'-diaminodiphenyl N-phenylamine, 1,4-diaminobenzene (p-phenylene diamine), 1,3-diaminobenzene, 1,2-diaminobenzene, and analogues of these diamines. Those diamines and the analogues thereof can be used alone or can be mixed at any ratio. From the viewpoint of achievement of a further increase in orientation of a polyimide film and from the viewpoint of availability, 4,4'-diaminodiphenyl ether and p-phenylene diamine are each particularly preferably used as a material to synthesize the aromatic polyimide.

A polyamide acid can be prepared, by a publicly known method, from such an acid dianhydride as listed above and such a diamine as listed above. The polyamide acid is produced by dissolving at least one aromatic acid dianhydride and at least one diamine in an organic solvent and stirring a resultant solution at a controlled temperature until polymerization of the acid dianhydride and the diamine is finished. Such a polyamide, acid solution can be obtained at a concentration of normally 5 wt % to 35 wt % and preferably 10 wt % to 30 wt %. The polyamide acid solution whose concentration falls within the above range makes it possible to achieve a suitable molecular weight and a suitable solution viscosity. The acid dianhydride and the diamine each contained in the above base solution are preferably substantially equimolar and have therebetween a molar ratio of, for example, 1.5:1 to 1:1.5, preferably 1.2:1 to 1:1.2, and more preferably 1.1:1 to 1:1.1.

Synthesis of Polymer Material and Film Formation

A film that is made of the polymer material can be produced, by a publicly known method, from the polymer material or a synthetic material thereof. Examples of a method for producing the polyimide include (i) a thermal cure method in which imide conversion from a polyamide acid, serving as a precursor, into polyimide is carried out by heating the polyamide acid; and (ii) a chemical cure method in which imide conversion from a polyamide acid, serving as a precursor, into polyimide is carried out with use of (a) a dehydrator typified by an acid anhydride such as acetic anhydride and/or (b) an imidization accelerator exemplified by tertiary amines such as picoline, quinoline, isoquinoline, and pyridine. The polyimide can be produced by either the thermal cure method or the chemical cure method. The chemical cure method is particularly preferable because a resultant film (i) is likely to have a low linear expansion coefficient, a high elastic modulus, and a great birefringence and (ii) makes it possible to obtain a high quality carbon film without being broken by tension that is applied to the film which is being calcined. The chemical cure method is excellent also because the chemical cure method allows the graphite sheet to have a higher thermal conductivity. The polyimide film is produced by casting, onto a support such as an endless belt or a stainless drum, an organic solvent solution containing a polyamide acid, serving as a precursor of the polyimide, and drying and imidizing the solution. Specifically, the film is produced by the chemical cure method as below. The dehydrator whose amount is equal to or greater than a stoichiometric amount and the imidization accelerator whose amount is a catalytic amount are added to the polyamide acid solution, and a resultant solution is cast or applied to a support such as (i) a supporting plate, (ii) an organic film (e.g., a PET), a drum, or (iv) an endless belt so that the solution is formed into a film. Then, the organic solvent is evaporated so that a film having a self-bearing property is obtained. The obtained film is further heated, while being dried, so as to imidized. The polyimide film is thus obtained. The heating is preferably carried out at a temperature falling within the range of 150° C. to 550° C. Furthermore, a process for producing the polyimide preferably includes the step of fixing and/or stretching the film so as to prevent a shrinkage in the film. A film in which a molecular structure and a high order structure of the molecular structure are controlled can be easily converted into a carbon film. That is, though carbon molecules in a graphite precursor need to be rearranged so that a graphitization reaction smoothly proceeds, the polyimide which is excellent in orientation requires minimum rearrangement of those carbon molecules, and thus conversion into graphite is considered to easily proceed even at a low temperature.

The graphite sheet which is used in an embodiment of the present invention has a thickness of not less than 10 nm and not more than 20 µm. In order to obtain the graphite sheet which has a thickness falling within the above range, a polymer film serving as a material for the graphite sheet preferably has a thickness of not less than 20 nm and not more than 50 µm. In a case where the graphite sheet is prepared from the aromatic polyimide. This is because a carbon film to be finally obtained has a thickness that typically depends on the thickness of a starting polymer film and because a graphite sheet to be obtained through carbonization and graphitization has a thickness that is approximately half the thickness of a polymer film serving as a material for the graphite sheet.

The following description discusses a method for producing the graphite sheet in accordance with an embodiment of the present invention. The graphite sheet which is used in an embodiment of the present invention can be produced from a given polymer material by being heat-treated at a temperature of not lower than 2400° C. under an inert gas atmosphere.

Carbonization and Graphitization

According to an embodiment of the present invention, a polymer film serving as a starting material is preheated in an inert gas or in a vacuum so as to be carbonized. The inert gas is preferably nitrogen, argon, or a mixed gas of argon and nitrogen. The preheating is ordinarily carried out at a temperature of approximately 1000° C. A rate at which to increase the temperature to the temperature at which to carry out the preheating is not limited to any particular rate. The rate is, for example, 5° C./minute to 15° C./minute. During the preheating, in order to prevent the polymer film serving as a starting material from losing orientation, it is effective to apply, to a film surface, a vertical pressure that is insufficient to break the film.

The film which has been carbonized by the above method is set in a high-temperature furnace so as to be graphitized. The carbonized film is preferably set by being provided between cold isostatic pressing materials (CIP materials) or substrates made of glassy carbon. In a case where the graphitization is carried out at a temperature of not lower than 2400° C., a resultant graphite sheet can have a thermal conductivity of not less than 500 W/mK in a direction in which a surface of the graphite sheet extends.

Note here that, in order to control an average crystal grain size of graphite crystal, it is preferable to set, to preferably not less than 3 hours, more preferably not less than 4 hours, and most preferably not less than 5 hours, a time for which the film is maintained at 2400° C. The time which falls within the above range is preferable because of the following reason. Specifically, since the graphitization gradually proceeds from the above temperature region and the film is stretched, by causing the film to be calcined for a longer time during an initial stage of the graphitization, the graphitization also proceeds equally into the graphite sheet while the average crystal grain size is being controlled. A too long time for which the film is maintained at 2400° C. results in longer-time production of the graphite sheet. The time for which the film is maintained at 2400° C. is thus set so as to be preferably not longer than 8 hours and more preferably not longer than 7 hours.

The graphitization is carried out at a maximum temperature of preferably not lower than 2400° C., more preferably not lower than 2600° C., still more preferably not lower than 2800° C., and most preferably not lower than 2900° C. A resultant graphite sheet can be heat-treated again by annealing. Such a high temperature is ordinarily produced by directly applying an electric current to a graphite heater, and Joule's heat of the graphite heater is used to carry out heating. The graphitization is carried out in an inert gas, as which argon is the most suitable. To the argon, a small amount of helium can be added. A higher treatment temperature allows conversion into high quality graphite. For example, a treatment temperature of not higher than 3700° C., in particular, not higher than 3600° C. or not higher than 3500° C. also makes it possible to obtain an excellent graphite sheet.

The temperature at which to carry out the preheating can be increased, at a rate of, for example, 1° C./minute to 25° C./minute, to the maximum temperature at which to carry out the heat treatment. A time for which the film is maintained at the maximum temperature at which to carry out the heat treatment can be, for example, not less than 10 minutes, preferably not less than 30 minutes, or not less than 1 hour. Ordinarily, the time for which the film is maintained at the maximum temperature at which to carry out the heat treatment can have an upper limit that is exemplified by but not particularly limited to approximately 10 hours, in particular, approximately 5 hours. In a case where the graphitization is carried out through the heat treatment at a temperature of not lower than 3000° C., an atmosphere in the high-temperature furnace is preferably pressurized with the inert gas. A high heat treatment temperature causes sublimation of carbon to start from a film surface, and causes a deterioration phenomenon such as a hole in a graphite sheet surface, spread of a crack in the graphite sheet surface, or a thinner graphite sheet surface. However, such a deterioration phenomenon can be prevented by pressurizing the atmosphere, so that an excellent graphite sheet can be obtained. The atmosphere in the high-temperature furnace is pressurized with the inert gas at a pressure (gage pressure) of, for example, not less than 0.05 MPa, more preferably not less than 0.10 MPa, and still more preferably not less than 0.14 MPa. The above pressure at which the atmosphere is pressurized can have an upper limit that is exemplified by but not particularly limited to approximately 2 MPa, in particular, approximately 1.8 MPa. After the heat treatment, the humidity can be decreased at a rate of, for example, 30° C./minute to 50° C./minute.

Method for Processing Graphite

A graphite sheet processed product in accordance with an embodiment of the present invention is produced by carrying out a cut process with respect to a graphite sheet in a direction that intersects a film surface of the graphite sheet. It is possible to carry out the cut process with respect to the graphite sheet with appropriate single or combined use of at least one cutter that is exemplified by but not particularly limited to scissors, a cutter, a trimming cutter, a waterjet cutter, a laser cutter, an ultrasonic cutter, and a combined cutter in which the waterjet cutter and the laser cutter are combined. Furthermore, it is possible to appropriately carry out a cut process with respect to a single graphite sheet or a plurality of stacked graphite sheets.

Recap

As described earlier, a graphite sheet processed product in accordance with an embodiment of the present invention includes: a graphite sheet, the graphite sheet processed product having a thickness of not less than 10 nm and not more than 20 µm, the graphite sheet processed product having, in at least a part thereof, a linear structure, the linear structure being a structure having a line width of less than 400 µm, the graphite sheet processed product having, on a cut surface thereof, a burr having a size that is not more than 15% of the line width, the graphite sheet having a cross-sectional area 90% or more of which is occupied by graphite layers each extending continuously or discontinuously in a horizontal direction, the cross-sectional area being observed with use of a scanning electron microscope (SEM), and the graphite sheet including therein graphite crystal having an average crystal grain size of not less than 0.35 µm and not more than 25 µm.

The graphite sheet processed product in accordance with an embodiment of the present invention is preferably configured such that the burr on the cut surface has a size of less than 50 µm.

The graphite sheet processed product in accordance with an embodiment of the present invention is preferably configured such that the thickness is not less than 30 nm and not more than 15 µm.

The graphite sheet processed product in accordance with an embodiment of the present invention is preferably configured such that the thickness is not less than 50 nm and not more than 9.6 µm.

The graphite sheet processed product in accordance with an embodiment of the present invention is preferably configured such that the graphite sheet has a cross-sectional area 95% or more of which is occupied by the graphite layers each extending continuously or discontinuously in the horizontal direction, the cross-sectional area being observed with use of the scanning electron microscope (SEM).

The graphite sheet processed product in accordance with an embodiment of the present invention is preferably configured such that the average crystal grain size is not less than 0.35 µm and not more than 20 µm.

The graphite sheet processed product in accordance with an embodiment of the present invention is preferably configured such that the average crystal grain size is not less than 0.4 µm and not more than 15 µm.

The graphite sheet processed product in accordance with an embodiment of the present invention is preferably configured such that the burr on the cut face has a size of less than 40 µm.

The graphite sheet processed product in accordance with an embodiment of the present invention is preferably configured such that the burr on the cut surface has a size of less than 30 µm.

The graphite sheet processed product in accordance with an embodiment of the present invention is preferably configured such that the graphite sheet has a density of not less than 1.80 g/cm$^3$ and not more than 2.26 g/cm$^3$.

The graphite sheet processed product in accordance with an embodiment of the present invention is preferably configured such that the graphite sheet has a thermal conductivity of less than 700 W/mK.

The graphite sheet processed product in accordance with an embodiment of the present invention is preferably configured such that the graphite sheet has an electric conductivity of not less than 5000 S/cm.

A method in accordance with an embodiment of the present invention for producing a graphite sheet processed product is a method for producing a graphite sheet processed product recited above, including: obtaining a graphite sheet by heat-treating a polymer film at a temperature of not lower than 2400° C. under an inert gas atmosphere.

The method in accordance with an embodiment of the present invention is preferably configured such that the polymer film is maintained, under the inert gas atmosphere, at a temperature of not lower than 2400° C. for not less than 3 hours.

The method in accordance with an embodiment of the present invention is preferably configured such that the polymer film is maintained, under the inert gas atmosphere, at a temperature of not lower than 2000° C. for not less than 3 hours.

The method in accordance with an embodiment of the present invention is preferably configured such that the polymer film is made of at least one polymer selected from polyamides, polyimides, polyquinoxaline, polyparaphenylene, polyoxadiazole, polybenzimidazole, polybenzoxazole, polybenzthiazole, polyquinazolinedione, polybenzoxazinone, polyquinazolone, benzimidazobenzophenanthroline ladder polymer, and derivatives of these polymers.

The method in accordance with an embodiment of the present invention is preferably configured such that the at least one polymer of which the polymer film is made is an aromatic polyimide.

The method in accordance with an embodiment of the present invention is preferably configured such that the at least one polymer of which the polymer film is made is an aromatic polyimide prepared from either pyromellitic anhydride or 3,3',4,4'-biphenyltetracarboxylic dianhydride, or from both pyromellitic anhydride and 3,3',4,4'-biphenyltetracarboxylic dianhydride.

The method in accordance with an embodiment of the present invention is preferably configured such that the at least one polymer of which the polymer film is made is an aromatic polyimide prepared from either 4,4'-diaminodiphenyl ether or p-phenylene diamine, or from both 4,4'-diaminodiphenyl ether and p-phenylene diamine.

The method in accordance with an embodiment of the present invention is preferably configured such that the graphite sheet is subjected to a cut process carried out with use of at least one of scissors, a cutter, a trimming cutter, a waterjet cutter, a laser cutter, an ultrasonic cutter, and a combined cutter in which the waterjet cutter and the laser cutter are combined.

The present invention is not limited to the embodiments, but can be altered by a skilled person in the art within the scope of the claims. The present invention also encompasses, in its technical scope, any embodiment derived by combining technical means disclosed in differing embodiments.

EXAMPLES

The following description more specifically discusses the embodiments of the present invention with reference to Examples. It is a matter of course that the present invention is not limited to the Examples, and it is needless to say that details of the present invention can be variously changed.

Method for Measuring Physical Properties

Film Thickness

The thickness of a polyimide film, serving as a material, and the thickness of a graphite sheet each had an error of approximately ±5% due to an issue of accuracy of measurement and depending on a location of measurement in a film (sheet). Thus, a thickness obtained by averaging thicknesses measured at respective 10 points in a resultant sheet was regarded as the thickness of a sample of the present Examples.

SEM Cross-Section Observation of Graphite Sheet

A produced graphite sheet was cut into graphite pieces approximately 5 millimeters square. The graphite pieces were each fixed, with a carbon tape, to a stand for cross-section observation and then subjected to measurement carried out with use of a scanning electron microscope (SEM) ("SU8000" manufactured by Hitachi High-Technologies Corporation). A photograph of the cut surface was taken in a field of view which was magnified 30000 times. An area of an entire film cross section was calculated based on the photograph, taken with use of the SEM, of the cut surface (SEM cross-section photograph), and then an area of a part in which graphite layers were tilted at an angle of not less than 10° was calculated as an area of a part in which the graphite layers are unhorizontal. A result of the calculation was substituted in the following equation so that horizontality of the graphite layers was calculated.

(Area of entire film cross section−area of part in which graphite layers are unhorizontal)/area of entire film cross section×100=horizontality of graphite layers Calculation of Average Crystal Grain Size of Graphite Crystal The average crystal grain size of graphite crystal was measured based on a crystal analysis image obtained by a channeling contrast method.

The produced graphite sheet (multilayer graphene) was fixed to a jig for SEM measurement with use of an electrically conductive double-sided adhesive tape so that the average crystal grain size of graphite crystal was measured with use of an SEM (4700, manufactured by Hitachi High-Technologies Corporation). In a case where a crystalline state of a surface of a measurement sample was not easily observed, the average crystal grain size of graphite crystal was measured after a surface of the graphite sheet was peeled with use of Scotch tape. Note that the average crystal grain size of graphite crystal was measured under conditions set as follows: a probe electric current: High, a focal point mode: normal, WD: 8.0 mm, a condenser lens 1:3.0 (check), a condenser lens 2 (check), a focal depth: 1.0, an inclination of stage: 5° to 7.5°, an acceleration voltage: 3.0 kV to 5.0 kV, emission: 20 µA, a detector, an SE detector Furthermore, a crystal grain size was measured, based on an SEM image, by a calculation method carried out with use of a line analysis method. Specifically, from the SEM image, the crystal grain size was calculated by making clear a grain boundary in a photograph of the crystal grain size with use of a red pen and then drawing 20 lines so as to count the number of intersections of those lines and the grain boundary, and dividing, by the number of intersections, the actual length, calculated from the size of the photograph, of the above lines.

Measurement of Burr

A cut surface of a cut graphite sheet was observed and photographed with use of an optical microscope. Then, the size of a part having irregularities whose degree was greatest in the cut surface was measured and calculated. More specifically, the size of a burr was calculated with use of a bar indicating the basic size of a photographed microscopic image.

Density

The density of the produced graphite sheet was calculated as below. Specifically, the volume of the graphite sheet was measured with use of a helium gas replacement type density meter ("AccuPycII1340" manufactured by Shimadzu Corporation), and the mass of the graphite sheet was separately measured, so that the density was calculated based on the equation of "Density (g/cm$^3$)=mass (g)/volume (cm$^3$)." The above measurement method made it possible to measure the density of a sample of the graphite sheet which sample had a thickness of not less than 500 nm. Note, however, that the above measurement method made it impossible to measure the density of the graphite sheet which had a thickness of less than 500 nm. This is because a too great error was observed in a case where the density of the graphite sheet which had a thickness of less than 500 nm was measured by the above measurement method.

Measurement of Thermal Conductivity

The thermal diffusivity of the graphite sheet was measured with use of a thermal diffusivity measuring device ("LaserPit" manufactured by ULVAC-RIKO, Inc.), in which measurement is carried out by a periodic heating method, at 20° C., under vacuum (at approximately 10$^{-2}$ Pa), and at a frequency of 10 Hz. According to the above method, a thermocouple is provided at a point that is spaced from a point of laser heating at a given distance, and a thermal change occurring at the point at which the thermocouple is provided is measured. Note here that the thermal conductivity (W/mK) was calculated by multiplying together the thermal diffusivity (m$^2$/s), the density (kg/m$^3$), and the specific heat (798 kJ/(kg·K)) of the graphite sheet. The above device made it possible to measure the thermal diffusivity of the graphite sheet which had a thickness of not less than 1 µm. However, the above device made it impossible to accurately measure the thermal diffusivity of the graphite sheet which had a thickness of not more than 1 µm. This is because such a graphite sheet made it difficult to provide a thermocouple and caused a great measurement error due to an influence of an electrically conductive adhesive with which to provide the thermocouple.

Under the circumstances, the thermal diffusivity of the graphite sheet was measured by a periodic heating and infrared radiation thermometer method ("Thermoanalyzer TA3" manufactured by Bethel Co., Ltd.) serving as a second thermal diffusivity measurement method. This is a device for carrying out periodic heating with use of a laser and carrying out temperature measurement with use of a radiation thermometer. According to the device, it is unnecessary to provide the graphite sheet with a thermocouple during the measurement, and it is possible to accurately measure the thermal diffusivity of even the graphite sheet which has a thickness of not more than 1 µm. In order that reliability of measured values obtained from both the above two thermal diffusivity measuring devices was confirmed, measurement was carried out with respect to some samples with use of both the thermal diffusivity measuring devices, and it was confirmed that numerical values obtained from the respective thermal diffusivity measuring devices matched each other.

Measurement of Electric Conductivity

The electric conductivity of the graphite sheet was measured by a van der Pauw's method. This method is the most suitable to measure the electric conductivity of a filmy sample. The method has a characteristic of (i) making it possible to measure the electric conductivity by providing electrodes at respective any four points in an edge part of the filmy sample which has any shape and (ii) making it possible to accurately measuring the electric conductivity of the sample which has a uniform thickness. According to the present Examples, the electric conductivity was measured by using the graphite sheet which had been cut into graphite pieces approximately 5 millimeters square, and providing silver paste electrodes at respective four corners (angles) of each of the graphite pieces. The electric conductivity was measured with use of "Resistivity/DC&AC Hall measurement system ResiTest 8300" manufactured by TOYO Corporation.

Production Example 1

With 100 g of an 18% by mass DMF solution containing a polyamide acid synthesized by reacting pyromellitic anhydride and 4,4'-diaminodiphenyl ether at a molar ratio of 1/1, a cuing agent containing 20 g of an acetic anhydride and 10 g of isoquinoline was mixed at 0° C. A resultant solution was stirred and defoamed by centrifugation and then cast and applied to aluminum foil. Furthermore, thickness adjustment was carried out with use of a thickness gauge. A film was thus prepared. Thereafter, this film was sequentially heated to 100° C., 250° C., 300° C., and 400° C., and polyimide films having different thicknesses each falling within the range of 50 μm to 1 μm (a polymer sample A) were prepared. Such a method makes it difficult to prepare polymer films having a uniform thickness falling within the range of 1 μm to 20 nm. Thus, a spin coater was used to produce several films different in thicknesses by changing the concentration of an amide acid solution and/or the number of revolutions of the spin coater.

Production Example 2

Production Example 2 produced a polyimide film as in the case of Production Example 1 except that Production Example 2 prepared a polymer sample B from pyromellitic anhydride and p-phenylene diamine. Furthermore, Production Example 2 produced a polyimide film as in the case of Production Example 1 except that Production Example 2 prepared a polymer sample C from 3,3',4,4'-biphenyltetracarboxylic dianhydride and p-phenylene diamine.

Examples 1 to 8

Eight polyimide films which had been produced in Production Example 1 and had different thicknesses (the polymer sample A, eight polyimide films having respective thicknesses of 25.0 μm, 10.0 μm, 7.5 μm, 2.5 μm, 1.4 μm, 0.8 μm, 0.3 μm, and 0.2 μm and each having an area of 10×10 cm$^2$) were each heated up to 1000° C. at a rate of 10° C./minute in an nitrogen gas with use of an electric furnace and preliminarily treated while being maintained at 1000° C. for 1 hour, A resultant carbonized sheet was set inside a cylindrical graphite heater, heated up to 2400° C. at a rate of 20° C./minute, and then maintained at 2400° C. for 3 hours. Thereafter, the carbonized sheet was heated up to 3000° C. at a rate of 20° C./minute. The carbonized sheet was maintained at 3000° C. for 30 minutes and then cooled at a rate of 40° C./minute. A graphite sheet was thus produced. The above process was carried out under a pressure of 0.10 MPa (1.0 kg/cm$^2$) in an argon atmosphere. Table 1 shows the thickness of a resultant graphite sheet, graphite horizontality obtained from an SEM cross-section photograph of the graphite sheet, the average crystal grain size of graphite crystal, the density of the graphite sheet, the thermal conductivity of the graphite sheet, the electric conductivity of the graphite sheet, cuttability of the graphite sheet, a burr on an edge surface of the graphite sheet, the line width of a graphite sheet processed product, and the size of a burr with respect to the line width of the graphite sheet processed product.

Example 1A

The graphite sheet obtained in Example 1 was cut into graphite pieces having a size of 2 mm×20 mm. Then, the graphite pieces obtained by the cutting were each placed on a hole at a center of an alumina substrate having a thickness of 0.5 mm and a diameter φ of 20 mm (having, at its center, a hole having a diameter φ of 2 mm) and fixed with use of silver paste (Dotite D-550 manufactured by FUJIKURA KASEI CO., LTD.). A graphite sheet was processed, with use of a YVO$_4$ laser marker (MD-V9900 manufactured by KEYENCE CORPORATION and having a wavelength of 1064 nm), so as to have a line width of 200 μm and a length of 1000 μm. A graphite sheet processed product was thus produced. Table 1 shows cuttability of the graphite sheet, a burr on an edge surface of the graphite sheet, the line width of a graphite sheet processed product, and the size of a burr with respect to the line width of the graphite sheet processed product.

Examples 2A, 3A, and 5A

Examples 2A, 3A, and 5A each produced a graphite sheet processed product as in the case of Example 1A except that Examples 2A, 3A, and 5A used the graphite sheets obtained in respective Examples 2, 3, and 5. Table 1 shows cuttability of the graphite sheet, a burr on an edge surface of the graphite sheet, the line width of a graphite sheet processed product, and the size of a burr with respect to the line width of the graphite sheet processed product.

Example 3B

The graphite sheet obtained in Example 3 was cut into graphite pieces having a size of 2 mm×20 mm. Then, the graphite pieces obtained by the cutting were each placed on a hole at a center of an alumina substrate having a thickness of 0.5 mm and a diameter φ of 20 mm (having hole of 2 mm) and fixed with use of silver paste (Dotite D-550 manufactured by FUJIKURA KASEI CO., LTD.). Then, a graphite sheet was processed, with use of a UV-YAG laser processing machine (model: Gemstone, manufactured by Electro Scientific Industries, Inc.) whose output is produced at a wavelength of 343 nm, so as to have a line width of 30 μm and a length of 150 μm. A graphite sheet processed product was thus produced. Table 1 shows cuttability of the graphite sheet, a burr on an edge surface of the graphite sheet, the line width of a graphite sheet processed product, and the size of a burr with respect to the line width of the graphite sheet processed product.

Example 5B

Example 5B produced a graphite sheet processed product as in the case of Example 3B except that Example 5B used the graphite sheet obtained in Example 5. Table 1 shows cuttability of the graphite sheet, a burr on an edge surface of the graphite sheet, the line width of a graphite sheet processed product, and the size of a burr with respect to the line width of the graphite sheet processed product.

Examples 9 to 11

Examples 9 to 11 each produced a graphite sheet by carrying out a process similar to those carried out in Examples 1 to 8, except that Examples 9 to 11 processed, at respective maximum temperatures of 2800° C., 2600° C., and 2400° C., a polyimide film which had been produced in Production Example 1 and had a thickness of 2.5 μm. Table 1 shows the thickness of a resultant graphite sheet, graphite horizontality obtained from an SEM cross-section photograph of the graphite sheet, the average crystal grain size of graphite crystal, the density of the graphite sheet, the thermal conductivity of the graphite sheet, the electric conductivity of the graphite sheet, cuttability of the graphite sheet, a burr on an edge surface of the graphite sheet, the line width of a graphite sheet, processed product, and the size of a burr with respect to the line width of the graphite sheet processed product.

Examples 12 and 13

Examples 12 and 13 each produced a graphite sheet under conditions similar to those of Examples 1 to 8, except that Examples 12 and 13 used the polymer sample B (having a thickness of 9.0 μm) and the polymer sample C (having a thickness of 8.0 μm), respectively, instead of 8 kinds of polyimide having different thicknesses (the polymer sample A). Table 1 shows the thickness of a resultant graphite sheet, graphite horizontality obtained from an SEM cross-section photograph of the graphite sheet, the average crystal grain size of graphite crystal, the density of the graphite sheet, the thermal conductivity of the graphite sheet, the electric conductivity of the graphite sheet, cuttability of the graphite sheet, a burr on an edge surface of the graphite sheet, the line width of a graphite sheet processed product, and the size of a burr with respect to the line width of the graphite sheet processed product.

Comparative Example 1

A polyimide film which had been produced in Production Example 1 and had a thickness of 2.5 μm (the polymer sample A, having an area of 10×10 cm$^2$) was heated up to 1000° C. at a rate of 10° C./minute, in an nitrogen gas with use of an electric furnace and preliminarily treated while being maintained at 1000° C. for 1 hour. Next, a resultant carbonized sheet was set inside a cylindrical graphite heater, heated up to 2200° C. at a rate of 20° C./minute, and then maintained at 2200° C. for 3 hours. The above process was carried out under a pressure of 0.10 MPa (1.0 kg/cm$^2$) in an argon atmosphere. Thereafter, the heating was stopped so that the carbonized sheet was cooled to a room temperature. Then, films having different thicknesses were produced. Table 1 shows the thickness of a graphite sheet obtained in Comparative Example 1, graphite horizontality obtained from an EM cross-section photograph of the graphite sheet, the average crystal grain size of graphite crystal, the density of the graphite sheet, the thermal conductivity of the graphite sheet, the electric conductivity of the graphite sheet, cuttability of the graphite sheet, a burr on an edge surface of the graphite sheet, the line width of a graphite sheet processed product, and the size of a burr with respect to the line width of the graphite sheet processed product.

Comparative Example 2

A polyimide film which had been produced in Production Example 1 and had a thickness of 2.5 μm (the polymer sample A, having an area of 10×10 cm$^2$) was heated up to 1000° C. at a rate of 10° C./minute in an nitrogen gas with use of an electric furnace and preliminarily treated while being maintained at 1000° C. for 1 hour. Next, a resultant carbonized sheet was set inside a cylindrical graphite heater, heated up to 2400° C. at a rate of 20° C./minute, and then maintained at 2400° C. for 0.5 hours. Then, the carbonized sheet was cooled at a rate of 40° C./minute. A graphite sheet was thus produced. The above process was carried out under a pressure of 0.10 MPa (1.0 kg/cm$^2$) in an argon atmosphere. Table 1 shows the thickness of a graphite sheet obtained in Comparative Example 2, graphite horizontality obtained from an SEM cross-section photograph of the graphite sheet, the average crystal grain size of graphite crystal, the density of the graphite sheet, the thermal conductivity of the graphite sheet, the electric conductivity of the graphite sheet, cuttability of the graphite sheet, a burr on an edge surface of the graphite sheet, the line width of a graphite sheet processed product, and the size of a burr with respect to the line width of the graphite sheet processed product.

Comparative Example 3

Comparative Example 3 produced a graphite sheet as in the case of Comparative Example 2 except that Comparative Example 3 maintained a carbonized sheet at 2400° C. for 1 hour. Table 1 shows the thickness of a resultant graphite sheet, graphite horizontality obtained from an SEM cross-section photograph of the graphite sheet, the average crystal grain size of graphite crystal, the density of the graphite sheet, the thermal conductivity of the graphite sheet, the electric conductivity of the graphite sheet, cuttability of the graphite sheet, a burr on an edge surface of the graphite sheet, the line width of a graphite sheet processed product, and the size of a burr with respect to the line width of the graphite sheet processed product.

Comparative Example 4

Comparative Example 4 produced a graphite sheet as in the case of Comparative Example 2 except that Comparative Example 4 maintained a carbonized sheet at 2400° C. for 2 hours. Table 1 shows the thickness of a resultant graphite sheet, graphite horizontality obtained from an SEM cross-section photograph of the graphite sheet, the average crystal grain size of graphite crystal, the density of the graphite sheet, the thermal conductivity of the graphite sheet, the electric conductivity of the graphite sheet, cuttability of the graphite sheet, a burr on an edge surface of the graphite sheet, the line width of a graphite sheet processed product, and the size of a burr with respect to the line width of the graphite sheet processed product.

Graphite Sheet Cutting Experiment

The graphite sheets produced in Examples 1 to 13 and Comparative Examples 1 to 4 were each cut, with use of a cutter 10 times, so as to be rectangular and have a line width of 2 mm (2000 μm) and a length of 10 cm. A graphite sheet in which neither a burr nor breakage was observed 8 or more times was regarded as being acceptable. Note that a burr herein refers to uneven irregularities, having a size of not less than 50 μm, on an edge surface of the graphite sheet which has been cut. Table 1 shows results of a graphite sheet cutting experiment. The results show that a burr is less likely to occur in each of the graphite sheets produced in Examples 1 to 8. Meanwhile, the results make it clear that breakage, a crack, or the like is more likely to occur in each of the graphite sheets produced in Comparative Examples 1 to 4.

Furthermore, in a case where the graphite sheets were processed with a laser so as to have a line width of 200 μm as in Examples 1A, 2A, 3A, and 5A, resultant graphite sheet processed products each had a burr having a size of less than 50 μm. This reveals that a burr is less likely occur in each of those graphite sheet processed products.

Moreover, in a case where the graphite sheets were processed with a laser so as to have a line width of 30 μm as in Examples 3B and 5B, resultant graphite sheet processed products each had a burr having a size of not more than 2 μm. This reveals that the graphite sheet processed products have been obtained by finely processing the graphite sheets so that a burr is less likely occur in each of the graphite sheet processed products.

In view of the above, in a case where a graphite sheet (i) has a thickness of not less than 10 nm and not more than 20 μm, (ii) has a cross-sectional area 90% or more of which is occupied by graphite layers each extending continuously or discontinuously in a horizontal direction, the cross-sectional area being observed with use of a scanning electron microscope (SEM), and (iii) includes therein graphite crystal having an average crystal grain size of not less than 5 μm and not more than 50 μm, the graphite sheet which is being cut can have a burr having a size of less than 50 μm.

TABLE 1

| | | | | Example 1 | Example 1A | Example 2 | Example 2A | Example 3 | Example 3A | Example 3B | Example 4 |
|---|---|---|---|---|---|---|---|---|---|---|---|
| Polymer sample | Thickness | | μm | A 25.0 | A 25.0 | A 10.0 | A 10.0 | A 7.5 | A 7.5 | A 7.5 | A 7.5 |
| Graphite producing condition | First stage | Rate of temperature increase | °C./minute | 10 | ← | ← | ← | ← | ← | ← | ← |
| | | Reached temperature | °C. | 1000 | ← | ← | ← | ← | ← | ← | ← |
| | | Maintenance time | hour | 1 | ← | ← | ← | ← | ← | ← | ← |
| | Second stage | Rate of temperature increase | °C./minute | 20 | ← | ← | ← | ← | ← | ← | ← |
| | | Reached temperature | °C. | 2400 | ← | ← | ← | ← | ← | ← | ← |
| | | Maintenance time | hour | 3 | ← | ← | ← | ← | ← | ← | ← |
| | Third stage | Rate of temperature increase | °C./minute | 20 | ← | ← | ← | ← | ← | ← | ← |
| | | Reached temperature | °C. | 3000 | ← | ← | ← | ← | ← | ← | ← |
| | | Maintenance time | hour | 0.5 | ← | ← | ← | ← | ← | ← | ← |
| Evaluation of graphite | Thickness | | μm | 9.6 | 9.6 | 4.7 | 4.7 | 2.1 | 2.1 | 2.1 | 1.2 |
| | Horizontality of graphite | | % | >99 | >99 | >99 | >99 | >99 | >99 | >99 | >99 |
| | Average crystal grain size | | μm | 2.26 | 2.26 | 2.32 | 2.32 | 2.43 | 2.43 | 2.43 | 2.44 |
| | Density | | g/cm³ | 2.05 | 2.05 | 2.07 | 2.07 | 2.11 | 2.11 | 2.11 | 2.22 |
| | Thermal conductivity | | W/mK | 1940 | 1940 | 2010 | 2010 | 2070 | 2070 | 2070 | 2080 |
| | Electric conductivity | | S/cm | 24800 | 24800 | 25100 | 25100 | 25300 | 25300 | 25300 | 25600 |
| | Cuttability | | | Cuttable | Cuttable | Cuttable | Cuttable | Cuttable | Cuttable | Cuttable | Cuttable |
| | Burr on edge surface | | μm | 15 | 15 | 11 | 12 | 13 | 15 | 1 | 17 |
| | Line width | | μm | 400 | 200 | 400 | 200 | 400 | 200 | 30 | 400 |
| | Size of burr with respect to line width | | % | 3.8 | 7.5 | 2.8 | 6.0 | 3.3 | 7.5 | 3.3 | 4.3 |

| | | | | Example 5 | Example 5A | Example 5B | Example 6 | Example 7 | Example 8 | Example 9 | Example 10 |
|---|---|---|---|---|---|---|---|---|---|---|---|
| Polymer sample | Thickness | | μm | A 1.4 | A 1.4 | A 1.4 | A 0.8 | A 0.3 | A 0.2 | A 2.5 | A 2.5 |
| Graphite producing condition | First stage | Rate of temperature increase | °C./minute | ← | ← | ← | ← | ← | ← | ← | ← |
| | | Reached temperature | °C. | ← | ← | ← | ← | ← | ← | ← | ← |
| | | Maintenance time | hour | ← | ← | ← | ← | ← | ← | ← | ← |

TABLE 1-continued

|  |  |  | | | | | | | | | |
|---|---|---|---|---|---|---|---|---|---|---|---|
| | Second stage | Rate of temperature increase | ° C./minute | ← | ← | ← | ← | ← | ← | ← | ← |
| | | Reached temperature | ° C. | ← | ← | ← | ← | ← | ← | ← | ← |
| | | Maintenance time | hour | ← | ← | ← | ← | ← | ← | ← | ← |
| | Third stage | Rate of temperature increase | ° C./minute | ← | ← | ← | ← | ← | ← | ← | ← |
| | | Reached temperature | ° C. | ← | ← | ← | ← | ← | ← | 2800 | 2600 |
| | | Maintenance time | hour | ← | ← | ← | ← | ← | ← | ← | ← |
| Evaluation of graphite | Thickness | | μm | 0.72 | 0.72 | 0.72 | 0.31 | 0.14 | 0.06 | 1.3 | 1.2 |
| | Horizontality of graphite | | % | >99 | >99 | >99 | >99 | >99 | >99 | 98 | 97 |
| | Average crystal grain size | | μm | 2.27 | 2.27 | 2.27 | 2.24 | 2.20 | 2.19 | 0.67 | 0.52 |
| | Density | | g/cm³ | 2.23 | 2.23 | 2.23 | — | — | — | 1.98 | 1.91 |
| | Thermal conductivity | | W/mK | 2000 | 2000 | 2000 | 2020 | 1980 | 1900 | 1740 | 1200 |
| | Electric conductivity | | S/cm | 24600 | 24600 | 24600 | 24900 | 24800 | 24400 | 17200 | 8400 |
| | Cuttability | | | Cuttable | Cuttable | Cuttable | Cuttable | Cuttable | Cuttable | Cuttable | Cuttable |
| | Burr on edge surface | | μm | 13 | 17 | 2 | 15 | 16 | 17 | 23 | 28 |
| | Line width | | μm | 400 | 200 | 30 | 400 | 400 | 400 | 400 | 400 |
| | Size of burr with respect to line width | | % | 3.3 | 8.5 | 6.7 | 3.8 | 4.0 | 4.3 | 5.8 | 7.0 |

|  |  |  | | Example 11 | Example 12 | Example 13 | Comparative Example 1 | Comparative Example 2 | Comparative Example 3 | Comparative Example 4 |
|---|---|---|---|---|---|---|---|---|---|---|
| Polymer sample | Thickness | | | A | B | C | A | A | A | A |
| | | | μm | 2.5 | 9.0 | 8.0 | 2.5 | 2.5 | 2.5 | 2.5 |
| Graphite producing condition | First stage | Rate of temperature increase | ° C./minute | ← | ← | ← | ← | ← | ← | ← |
| | | Reached temperature | ° C. | ← | ← | ← | ← | ← | ← | ← |
| | | Maintenance time | hour | ← | ← | ← | ← | ← | ← | ← |
| | Second stage | Rate of temperature increase | ° C./minute | ← | ← | ← | 20 | 20 | 20 | 20 |
| | | Reached temperature | ° C. | ← | ← | ← | 2200 | 2400 | 2400 | 2400 |
| | | Maintenance time | hour | ← | ← | ← | 3 | 0.5 | 1 | 2 |
| | Third stage | Rate of temperature increase | ° C./minute | ← | ← | ← | | | | |
| | | Reached temperature | ° C. | 2400 | ← | ← | | | | |
| | | Maintenance time | hour | ← | ← | ← | | | | |
| Evaluation of graphite | Thickness | | μm | 1.2 | 4.3 | 3.4 | 1.1 | 1.2 | 1.2 | 1.2 |
| | Horizontality of graphite | | % | 97 | >99 | >99 | 78 | 82 | 85 | 86 |
| | Average crystal grain size | | μm | 0.40 | 2.29 | 2.31 | 0.11 | 0.24 | 0.28 | 0.32 |
| | Density | | g/cm³ | 1.83 | 2.15 | 2.20 | 1.71 | 1.76 | 1.78 | 1.79 |
| | Thermal conductivity | | W/mK | 700 | 2040 | 2060 | 45 | 340 | 550 | 620 |
| | Electric conductivity | | S/cm | 5200 | 24700 | 25000 | 670 | 1880 | 2510 | 3550 |
| | Cuttability | | | Cuttable | Cuttable | Cuttable | Un-Cuttable | Cuttable | Cuttable | Cuttable |
| | Burr on edge surface | | μm | 45 | 21 | 21 | 55 | 56 | 51 | 52 |
| | Line width | | μm | 400 | 400 | 400 | 400 | 400 | 400 | 400 |
| | Size of burr with respect to line width | | % | 11.3 | 5.3 | 5.3 | 13.8 | 14.0 | 12.8 | 13.0 |

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

INDUSTRIAL APPLICABILITY

The present invention cart be used for an electrode, a wire, a sensor, a vibration plate, a reflecting plate, and a heat radiating material.

The invention claimed is:

1. A method for producing a graphite sheet processed product, comprising:
obtaining a graphite sheet by a two-heating step (i) maintaining a polymer film at a temperature of not lower than 2400° C. but below 2800° C. under an inert gas atmosphere for not less than 3 hours and then (ii) graphitizing the polymer film at a maximum temperature of not lower than 2900° C.,
wherein the graphite sheet is subjected to a cut process carried out using at least one of scissors, a cutter, a trimming cutter, a waterjet cutter, a laser cutter, an ultrasonic cutter, or a combined cutter in which the waterjet cutter and the laser cutter are combined.

2. The method as set forth in claim 1, wherein the polymer film is maintained, under the inert gas atmosphere, at a temperature of not lower than 2900° C. for not less than 3 hours,
wherein the polymer film is made of at least one polymer selected from the group consisting of polyamides, polyimides, polyquinoxaline, polyparaphenylene, polyoxadiazole, polybenzimidazole, polybenzoxazole, polybenzthiazole, polyquinazolinedione, polybenzoxazinone, polyquinazolone, benzimidazobenzophenanthroline ladder polymer, and derivatives of these polymers.

3. The method as set forth in claim 1, wherein the polymer film is made of at least one polymer selected from the group consisting of polyamides, polyimides, polyquinoxaline, polyparaphenylene, polyoxadiazole, polybenzimidazole, polybenzoxazole, polybenzthiazole, polyquinazolinedione, polybenzoxazinone, polyquinazolone, benzimidazobenzophenanthroline ladder polymer, and derivatives of these polymers.

4. The method as set forth in claim 1, wherein the at least one polymer of which the polymer film is made is an aromatic polyimide.

5. The method as set forth in claim 1,
wherein the graphite sheet is subjected to the cut process carried out using at least one of the laser cutter or the combined cutter in which the waterjet cutter and the laser cutter are combined,
wherein the linear structure is a structure having a line width of less than 300 μm, and
wherein the graphite sheet processed product has, on a cut surface thereof, a burr having a size that is not more than 10% of the line width.

* * * * *